United States Patent [19]

Miki et al.

[11] 4,220,738
[45] Sep. 2, 1980

[54] PROCESS FOR PRODUCING BLOCK COPOLYMER FROM CONJUGATED DIENE AND VINYL AROMATIC

[75] Inventors: Tamotsu Miki; Shizuo Narisawa; Hideki Horiike; Ichiro Ichikawa, all of Ichihara, Japan

[73] Assignee: Sumitomo Chemical Company, Limited, Osaka, Japan

[21] Appl. No.: 890,942

[22] Filed: Mar. 28, 1978

Related U.S. Application Data

[63] Continuation of Ser. No. 460,550, Apr. 12, 1974, abandoned.

[30] Foreign Application Priority Data

Apr. 19, 1973 [JP] Japan .................. 48-44806
May 4, 1973 [JP] Japan .................. 48-50103
Dec. 15, 1973 [JP] Japan .................. 48-140482

[51] Int. Cl.$^2$ .................. C08F 297/04; C08F 293/00
[52] U.S. Cl. .................. 525/242; 264/142; 525/244; 525/250; 525/256; 525/258
[58] Field of Search .................. 525/242, 244, 250, 256, 525/258

[56] References Cited

U.S. PATENT DOCUMENTS

| | | | |
|---|---|---|---|
| 3,149,182 | 9/1964 | Porter | 260/880 B |
| 3,287,333 | 11/1966 | Zelinski | 526/181 |
| 3,402,159 | 9/1968 | Hsieh | 260/880 B |
| 3,418,394 | 12/1968 | Wofford | 260/880 B |
| 3,560,593 | 2/1971 | Hsieh | 260/880 B |
| 3,872,068 | 3/1975 | Horiie | 260/880 B |
| 3,906,058 | 9/1975 | Durst | 260/876 B |
| 3,953,543 | 4/1976 | Futamura | 260/880 B |

*Primary Examiner*—C. A. Henderson, Jr.
*Attorney, Agent, or Firm*—Stevens, Davis, Miller & Mosher

[57] ABSTRACT

By block-copolymerizing a mixture of an aromatic vinyl compound and a conjugated diene in two stages in an aliphatic hydrocarbon solvent, using an organomonolithium compound or an organodilithium compound as a polymerization initiator, a block copolymer is formed as a suspension polymer in a slurry state.

The resulting block copolymer is very clear and excellent in mechanical properties, especially, strength, elongation and impact strength. It has a wide application in the field of general resins.

21 Claims, 1 Drawing Figure

FIG. 1

PROCESS FOR PRODUCING BLOCK COPOLYMER FROM CONJUGATED DIENE AND VINYL AROMATIC

This is a continuation of application Ser. No. 460,550 filed Apr. 12, 1974, now abandoned.

The present invention relates to a novel process for producing a block copolymer resin which is clear and excellent in mechanical properties, especially elongation and impact strength. More particularly the present invention pertains to a process for producing a block copolymer by carrying out a block copolymerization on a mixture of an aromatic vinyl compound monomer and a conjugated diene monomer using an organolithium compound as a polymerization initiator, which comprises using an aliphatic hydrocarbon as the solvent and adding the monomers in a specially designed order to carry out the polymerization and thereby obtaining the resulting block copolymer in a state suspended in the solvent, and also it pertains to a process for producing a clear copolymer resin in an extremely simplified way using a novel process including such a suspension polymerization process.

The attached diagram is a schematic diagram showing an example of a process suitable for a production of a copolymer resin according to the process of the present invention.

Figure 1:
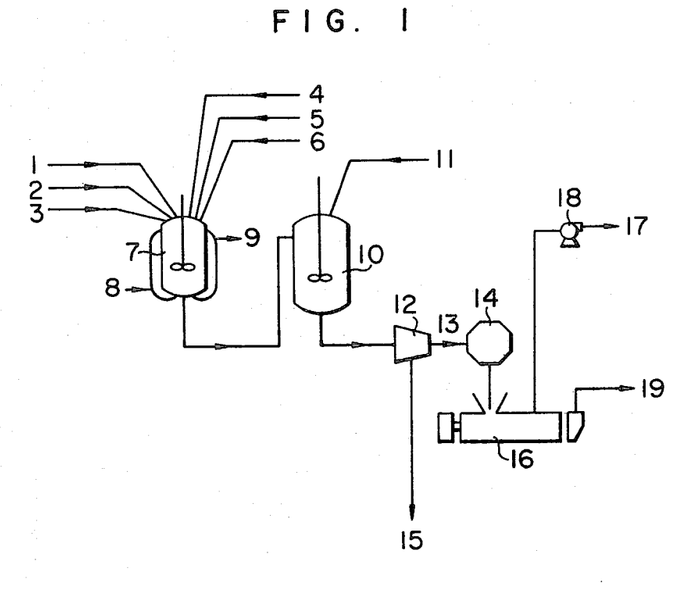

In the diagram, 1 is an aromatic vinyl monomer, 2 is a conjugated diene monomer, 3 is a solvent, 4 is an anionic polymerization initiator, 5 is an activator, 6 is a dispersing agent, 7 is a polymerization vessel, 8 and 9 are cooling water, 10 is a slurry tank, 11 is a polymerization stopper, 12 is a solvent-separating machine, 13 is polymer particles, 14 is a mixer for additives or the like, 15 is a recovered solvent, 16 is a vent type extruder, 17 is a volatile solvent or the like, 18 is a vacuum pump and 19 is pellets.

It has been so far known that various block copolymers having different structures can be obtained by copolymerizing aromatic vinyl compounds and conjugated diene compounds using an alkali metal or an organoalkali metal as a polymerization initiator. In particular, it is known that when the amount of an aromatic vinyl compound contained in a block copolymer is comparatively large, the resulting block copolymer provides a resin which is clear and excellent in mechanical properties, especially elongation and impact strength, by making a selection of polymerization condition.

For example, two-stage block copolymerization processes using styrene, butadiene and the like as raw materials are proposed in Japanese Patent Publication No. 19286/61 and Japanese Patent Publication No. 2423/73, and 4- to 5-stage block polymerization processes which comprise using the similar monomers as raw materials are described in Japanese Patent Publication No. 3252/72 and Japanese Patent Publication No. 28915/72. Also onestage polymerization processes using the same kind of monomers are described in German Patent Laid-Open Specification No. 2120232 and Japanese Patent Laid-Open Specification No. 7597/71.

In these cases, solvents used for polymerization are usually inactive hydrocarbons from the necessity of being inactive to a polymerization initiator because an alkali metal or an organoalkali metal is used as the initiator. According to the conventional processes, however, the operation for polymerization and the recovery of a resin are remarkably difficult. This is because, if an aromatic hydrocarbon or an alicyclic hydrocarbon is used as a solvent at the time of polymerization, the produced copolymer is uniformly dissolved in the solvent and therefore a very complicated operation is needed to separate the resin as a solid from the solvent, or if an aliphatic hydrocarbon is used as a solvent, the produced copolymer is separated in a lumpy state or sticks to the vessel wall without dissolving in the solvent.

Heretofore, there have been proposed some methods of producing a polymer in a state suspended in a solvent, though the methods relate mainly to the production of polystyrene or styrene derivative resins. For example, the following process is proposed in U.S. Pat. No. 3,402,160. That is, there is a description that when a small amount of a high polymer of hydrocarbons such as polybutadiene, a styrene-butadiene copolymer, polyisoprene, polypropylene, polybutene, and an ethylene-propylene copolymer, is added to a reaction system in carrying out an anionic polymerization of a styrene monomer in a saturated hydrocarbon solvent using an organolithium compound, the produced styrene resin is dispersed in a form of fine particles in a medium without sticking to the wall of a reaction vessel or without depositing in a form of lumps and therefore the resin can be easily separated and recovered. Further, in Japanese Patent Publication No. 2156/67 there is proposed a process for producing a granular styrene polymer with a narrow molecular weight distribution by polymerizing a styrene monomer in a solvent which dissolves the sytrene monomer but does not dissolve the sytrene polymer, using an organoalkali metal or a Lewis base modified organoalkali metal as a polymerzation initiator, characterized by adding a rubbery high polymer compound in an amount sufficient to suspend the resulting polymer in the said solvent and an organoalkali metal or a Lewis base modified organoalkali metal compound to the solvent in advance and allowing them to react with each other, and then allowing the reaction product to react with a small amount of styrene monomer and after the reaction, making the firstly added initiator inactive before the polymerization is carried out on a mixture of a required amount of styrene monomer and an organoalkali metal or a Lewis base-modified organoalkali metal compound, which have been further added. Also Japanese Patent Publication No. 30298/72 contains a description of an anionic dispersion polymerization process of alpha-methylstyrene using poly(-vinylalkylether) as a dispersing agent. Further, an anionic dispersion polymerization process of a styrene resin using siloxane is described in Japanese Patent Laid-Open Specification No. 25288/72.

However, these processes have serious defects in that deterioration takes place in the clarity of resin, because a rubbery high polymer compound added as a dispersing agent or the added siloxanes get intermixed into the formed styrene resin, and that a considerable part of the initiator is made inactive by the added rubbery high polymer compound or siloxanes and therefore the polymerization reaction proceeds for the first time by using a large amount of expensive initiator. Further, the resulting resin is very low in mechanical properties, especially elongation and impact strength.

The present inventors have undertaken a research on a process for obtaining a resin which is in a state suspended in a solvent and is free from the above defects, and is clear and great in impact strength. As a result of an intensive research, the inventors found that when a copolymerization is carried out on a mixture of an aromatic vinyl compound monomer and a conjugated diene monomer in an aliphatic hydrocarbon solvent using an organolithium compound as a polymerization initiator, the above objects can be attained by controlling the addition of these two monomers, and accomplished the present invention.

An object of the present invention is to provide a two-block copolymer resin which is clear and excellent in mechanical properties, comprising an elastomeric copolymer block composed of an aromatic vinyl compound monomer and a conjugated diene monomer and a non-elastomeric block composed of an aromtic vinyl compound monomer and a process for producing the same.

Another object of the present invention is to provide a three-block copolymer resin which is clear and excellent in mechanical properties, having non-elastomeric blocks composed of an aromatic vinyl compound monomer at both ends and an elastomeric copolymer block composed of an aromatic vinyl compound monomer and a conjugated diene monomer and a process for producing the same.

The other objects and embodiments of the present invention will be apparent from the explanation given below.

In one of the embodiments of the present invention, a two-block copolymer resin which is clear and excellent in mechanical properties, especially elongation and impact strength is obtained according to a suspension polymerization process which comprises block-copolymerizing a mixture of 90 to 70 parts by weight of an aromatic vinyl compound monomer and 10 to 30 parts by weight of a conjugated diene monomer in two stages using an organomonolithium compound as a polymerization initiator, characterized by using an aliphatic hydrocarbon as a solvent, and in the polymerization of the first stage, adding a mixture of 10 to 60 parts by weight of the aromatic vinyl compound monomer out of total weight thereof and total weight of the conjugated diene monomer to the reaction system to polymerize all the monomers substantially for the formation of an elastomeric copolymer block, and in the polymerization of the second stage, continuously adding all the remaining aromatic vinyl compound monomer to the reaction system at a lower polymerization rate than a substantially average polymerization rate at the polymerization temperature to polymerize all the monomers substantially for the formation of a non-elastomeric block.

Further, in the other embodiment of the present invention, a three-block copolymer resin which is clear and excellent in mechanical properties, especially elongation and impact strength, is obtained according to a suspension polymerization process which comprises block-copolymerizing a mixture of 90 to 70 parts by weight of an aromatic vinyl compound monomer and 10 to 30 parts by weight of a conjugated diene monomer in two stages using an organodilithium as a polymerization initiator to produce a block copolymer composed of three blocks, characterized by using an aliphatic hydrocaron as a solvent and in the polymerization of the first stage, adding a mixture of 10 to 60 parts by weight of the aromatic vinyl compound monomer out of the total weight thereof and total weight of the conjugated diene monomer to the reaction system to polymerize all the monomers substantially for the formation of an elastomeric copolymer block in the middle, and subsequently in the polymerization of the second stage, continuously adding all the remaining aromatic vinyl compound monomer to the reaction system at a lower polymerization rate than a substantially average polymerization rate at the polymerization temperature to polymerize all the monomers substantially for the formation of non-elastomeric blocks of both ends.

Further, the present invention provides a process for producing a clear resin including not only step (a) which comprises carrying out a suspension polymerization on a mixture of an aromatic vinyl compound and a conjugated diene as mentioned above but also at least the undermentioned steps (b) and (c).

(b) A solid-liquid separation step which comprises separating the produced polymer particles from the solvent.

(c) A pelletizing step which comprises heating, kneading and drying the separated polymer particles under a reduced pressure and then pelletizing the dried polymer.

In addition to the above steps, the process of the present invention may include all of the standard manufacturing steps, for example, the manufacturing steps of the under-mentioned (d) to (i) in ordinary polymer production steps, or may omit a part of the manufacturing steps.

(d) A step for refining the monomers to be used.

(e) A step for preparing a catalyst.

(f) A step for recovering unreacted monomers.

(g) A step for stopping the polymerization to treat a polymer with a proper solvent.

(h) A step for recovering and refining the solvent.

(i) A step for blending the resulting polymer with stabilizing agents, additives or the like.

In this case, the operations in the steps of (d) to (i) can be carried out in accordance with the conventional procedures. There is no special limit to the operations.

The present invention is concretely explained below.

The aliphatic hydrocarbons used as solvents for the present invention are saturated aliphatic hydrocarbons having 3 to 20 carbon atoms, and include propane, butane, pentane, hexane, heptane, nonane, decane, and the like. These compounds can be used each alone or as a mixture of two or more. Further, the amount of the aliphatic hydrocarbon solvent to be used is 1 to 20 parts by weight, preferably 2 to 10 parts by weight, per part by weight of a mixture of all the monomers.

The organomonolithium compounds used for the process of the present invention include an alkyl having 2 to 12 carbon atoms or a cycloalkyl or aryllithium compounds and more concretely, ethyllithium, propyllithium, butyllithium, amyllithium, hexyllithium, 2-ethylhexyllithium, cyclohexyllithium, decyllithium, dodecyllithium, phenyllithium, tolyllithium, xylyllithium, naphthyllithium, and the like. The amount of these organomonolithium compounds to be used is 0.005 to 5 mol %, preferably 0.01 to 1 mole %, based on the whole monomer mixture. These organomonolithiums may be used each alone or as a mixture of two or more.

The organodilithium compounds used for the process of the present invention include, concretely, alkylenedilithium compounds such as trimethylenedilithium, tetramethylenedilithium, pentamethylenedilithium, and the like, and complex reaction products prepared by allowing a condensation type or non-condensation type polycyclic aromatic compound to react with a lithium metal in a Lewis basic solvent such as an ether compound. As the examples of the complex reaction products, there can be mentioned a naphthalene lithium complex, stilbenelithium complex, biphenyllithium complex, and the like.

Further, a complex reaction product obtained as a result of a reaction between such a condensation type or non-condensation type polycyclic aromatic compound and lithium can be formed into a dianionic hydrocarbon oligomer by allowing it to react with a small amount of a conjugated diene. And the resulting dianionic hydrocarbon oligomer can be used as a polymerization initiator after the Lewis basic solvent such as an ether compound used for the reaction is distilled off, or is replaced by an aliphatic hydrocarbon without being distilled off. The use of such a kind of initiator is particularly preferable.

The amount of an organodilithium compound to be used is 0.002 to 3 mol %, preferably 0.005 to 0.5 mol %, based on the whole monomer mixture. These organodilithium compounds may be used each alone or as a mixture of two or more.

As the aromatic vinyl compounds for use in the present invention, there are used styrene, alphamethyl styrene and nucleus-substituted styrene such as vinyltoluene, and the like. Particularly styrene is suitable. As the conjugated dienes, there are used 1,3-butadiene, isoprene, piperylene, and the like, and 1,3-butadiene is preferable. The amount of an aromatic vinyl compound to be used in the present invention is 90 to 70 parts by weight per total weight of all the monomers. Accordingly, the conjugated diene is used in an amount ranging from 10 to 30 parts by weight per total weight of all the monomers. With respect to these monomers and the aforesaid aliphatic hydrocarbon solvents, the substances which destroy the polymerization initiator and the living polymer used in the present invention, for example, water, oxygen, carbon dioxide, a certain kind of sulfur compound and acetylenes, have to be sufficiently removed in advance from those monomers and solvents.

According to the two-stage polymerization process of the present invention, a mixture of an aromatic vinyl compound monomer and a conjugated diene monomer is added, at the first stage of polymerization, to the reaction system in the presence of an organomonolithium compound or an organodilithium compound, and all the monomers used are substantially polymerized to form an elastomeric copolymer block. In the first stage, there are added 10 to 60 parts by weight of the aromatic vinyl compound monomer out of the total weight thereof and the total weight of the conjugated diene monomer. In this case, the formation of a copolymer block composed of the aromatic vinyl compound and the conjugated diene is required in the polymerization carried out in the first stage. Particularly, in the first stage, when an aromatic vinyl compound alone is used, the resulting polymer will be undesirably deposited in a lumpy state or stick to the wall of the reaction vessel. On the other hand, when a conjugated diene is used alone in the first stage, the resulting block copolymer becomes undesirably much lower in mechanical properties, especially elongation.

Further, in order to form an elastomeric copolymer block of the first stage, it is possible to add a Lewis basic compound, for example, an ether compound. As the ether compounds, there are effectively used cyclic ether such as tetrahydrofuran, and tetrahydropyran; aliphatic monoether such as diethylether; or aliphatic polyethers such as diethyleneglycol-dimethylether. The aforesaid Lewis basic compounds for example ethers, are used in an amount of 10% by weight or less, preferably 2% by weight or less, per total weight of all the monomers. When the Lewis basic compound is used in an amount exceeding 10% by weight per total weight of all the monomers, the amount of vinyl bonds contained in the elastomeric copolymer block is remarkably increased, which raises the glass transition point (Tg), so that the mechanical properties and low temperature characteristics of the resin which make the object of the present invention are undesirably deteriorated.

Subsequently, in the second stage of polymerization, the remaining aromatic vinyl compound monomer is added to the polymerization system and the polymerization is continued to form a non-elastomeric block comprising a polymer of the aromatic vinyl compound. In this case, it is necessary to add the remaining aromtic vinyl compound monomer continuously at a lower polymerization rate than the substantially average polymerization rate at the polymerization temperature. The average polymerization rate in this case means an average polymerization rate of the aromatic vinyl monomer alone at the polymerization condition. That the monomer is added to the polymerization system at a lower polymerization rate than the average polymerization rate means that the added monomer is substantially polymerized at once and that no unreacted monomer is substantially present in the reaction system. However, when the monomer is added intermittently, a condition that the existence of the unreacted monomer remaining in the reaction system can be disregarded substantially on an average should be regarded as being included in the present invention, too. An anionic polymerization rate of the aromatic vinyl compound monomer is generally very high. Hence, adding the monomer at the rate at which no monomer is substantially present in the reaction system is not accompanied by any difficulty in practical application.

Further, in the second stage of polymerization, if the aromatic vinyl compound monomer is added at a time or rapidly at a rate exceeding the average polymerization rate, the resulting copolymer will undesirably stick to the wall of the reaction vessel or deposit lumpishly. A suspension condition good enough for a solvent can be obtained for the first time by using such a method of adding monomers as defined in the present invention. Even at the polymerization of the second stage, the added monomer is all polymerized substantially, so that the yield of the copolymer in whole can be made 100% substantially.

An average molecular weight of a two-block copolymer comprising (elastomeric block)-(non-elastomeric block) produced using an organomonolithium as a polymerization initiator according to the process of the present invention is about 10,000 to 1,000,000 for the part of the non-elastomeric block and about 2,000 to 250,000 for the part of the elastomeric block comprising a copolymer of an aromatic vinyl compound and a conjugated diene. When the average molecular weight is smaller than these ranges, the mechanical properties of the copolymer become poor and when larger, the processing properties are undesirably deteriorated.

Further, an average molecular weight of a three-block copolymer comprising (non-elastomeric block)-(elastomeric block)-(non-elastomeric block) produced using an organodilithium compound as a polymerization initiator is about 10,000 to 500,000 for the part of the non-elastomeric blocks and about 2,000 to 250,000 for the part of the middle elastomeric block comprising a copolymer of an aromatic vinyl compound and a conjugated diene. When the average molecular weight is smaller than these ranges, the mechanical properties of the copolymer become poor and when much larger, the processing properties are undesirably deteriorated.

The polymerization is usually carried out at a temperature of −20° C. to 150° C., preferably 20° C. to 80° C. The conversion in each steps carried out in two-stage polymerization is substantially 100%. A pressure is selected from the pressures enough to keep the monomers and the solvent in a liquid phase within the polymerization temperature range. The polymerization time varies depending upon the conditions for polymerization, but a range up to 48 hours, usually from 1 to 24 hours is enough. Further, the addition-starting time for the monomer to be added in the second stage of polymerization has no special limit as long as the conversion has reached substantially 100% in the polymerization carried out at the first stage. Usually, the operation of polymerization is carried out batchwisely or continuously using an autoclave having jackets and a stirrer.

After the completion of polymerization, water, methanol or isopropyl alcohol or the like is added to the polymerization system in an amount enough to make the active ends and the residual polymerization initiator inactive. After that, the resulting copolymer resin can be easily separated from the solvent by using an ordinary filtration process and the like. Therefore it is unnecessary to use troublesome processes such as a process for recovering the polymer which comprises precipitating the polymer dissolved in the solution by adding an excessive methanol or isopropyl alcohol or the like and filtering the precipitates, or a process for recovering the polymer which comprises heating the polymer solution to evaporate off the solvent, or a process for recovering the polymer which comprises blowing steam into the polymer solution to distill the solvent off by steam distillation.

The block copolymer of the present invention can be used in combination with the conventional stabilizing agents, reinforcing agents, fillers and the like by usual procedures.

Subsequently, an example of an operation suitable for carrying out the process of the present invention is explained by way of the attached diagram.

In the diagram, an aromatic vinyl monomer (1), a conjugated diene monomer (2), a solvent (3), a polymerization initiator (4) and an activator (5), and if necessary, a dispersing agent (6) are placed into a polymerization vessel (7) in the required amount in the required order. Then a polymerization is conducted under a temperature regulated by cooling water in the jackets (8) and (9). After the completion of polymerization, a procedure such as an addition of a polymerization stopper (11) is taken in a slurry tank (10) if the necessity arises and further a procedure such as washing or the like is taken as occasion demands. Then the resulting polymer is sent to a separation step, wherein the produced polymer particles are separated from the solvent. In this solid-liquid separation step, the separation operation is commonly carried out continuously or batchwisely by using a centrifugal precipitation separation type separator (12). The condition for separation is decided on rationally, taking into account the dispered conditions of a polymer suspension liquid and the properties of particles. The polymer particles (13) separated in the separation step are subjected to an operation (14) such as blending and adding of additives as occasion demands, and then they are sent to the drying and pelletizing steps. On the other hand, the solvent (15) is sent to the unreacted monomer recovering step, the solvent recovering step and refining step as occasion demands.

In the drying and pelletizing steps, the separated polymer particles are heated, kneaded and dried under a reduced pressure, and at the same time extruded to be formed into pellets (19). These operations are usually carried out continuously using a one-step or multi-step vent type extruder (16). The conditions for operations of a vacuum pump (18) and the extruder are rationally decided on, taking into consideration not only the properties of polymer particles, but also the amount and kind of a solvent accompanies therewith. Further, the solvents (17) evaporated from the vent part is recovered by a proper method and the recovered solvent is sent to the solvent refining step. Of course, any other suitable method than the vent type extruder can be used in heating, kneading and drying the polymer under a reduced pressure. As mentioned above, since the two steps: drying and pelletizing, can be carried out simultaneously, the process of the present invention is extremely simplified, which greatly decreases the construction cost and operational cost as compared with the known methods. Thus, the process of the present invention is industrially very advantageous.

As stated above, an object of the present invention is to provide a process for producing a block copolymer resin according to a suspension polymerization process which comprises block-copolymerizing a mixture of 90 to 70 parts by weight of an aromatic vinyl compound monomer and 10 to 30 parts by weight of a conjugated diene monomer in two stages using an organolithium compound as a polymerization initiator, characterized by using an aliphatic hydrocarbon as a solvent, and in the polymerization of the first stage, adding a mixture of 10 to 60 parts by weight of the aromatic vinyl compound monomer out of total amount thereof and total amount of the conjugated diene monomer to the reaction system to polymerize all the monomers substantially for the formation of an elastomeric copolymer block, and subsequently in the polymerization of the second stage, continuously adding all the remaining aromatic vinyl compound monomer to the reaction system at a lower rate than a substantially average polymerization rate at the polymerization temperature, and continuing the polymerization to polymerize all the monomers substantially for the formation of a non-elastomeric block. The resulting copolymer can be easily separated from the solvent by usual operation merely such as filtration. The thus obtained copolymer has such features that it has excellent mechanical properties, especially, tensile strength, elongation and impact strength and further a very excellent clarity, and that it is hard to whiten when it is bent.

The embodiments of the present invention are explained below by way of examples, but the present invention shall not be limited by the examples as long as the gist of the invention is not exceeded.

EXAMPLE 1

The inside of a pressure resistant glass autoclave with a capacity of 2.5 liters having a stirrer was substituted with an inert gas, and into the autoclave were placed 1.5 liters of dry hexane which had been dehydrated and deaerated in advance and 40 g. of styrene which was newly distilled and dried through a column packed with silica gel and 0.36 g. (5.0 millimols) of tetrahydrofuran. Subsequently, an n-butyllithium-hexane solution (it was determined by titration in advance that the solution has a concentration of 182 millimols/liter as active n-butyllithium), was dropped into the autoclave from a burette under an inert gas atmosphere, and dropping was continued until the liquid in the autoclave had a yellowish orange color given by the living polystyryllithium. Thirteen milliliters of the solution had to be dropped until the color could be seen, and the dropped amount was equal to a slight amount of water and an equivalent of the other impurities remaining in the polymerization vessel including a polymerization solvent. Further, 10.9 milliliters of n-butyllithium solution (2.0 millimols as active n-butyllithium) were added as an initiator to initiate polymerization and 40 g. of a refined and dried butadiene were further added. The autoclave was then heated to 50° C. from outside and the polymerization was started. The polymerization of the first stage was carried out for three hours with stirring. The polymerization liquid slightly took a red color. Neither lumpish deposits nor polymer's sticking to the vessel wall was recognized. Three hours later, 120 g of styrene were added to the reaction system to start the polymerization of the second stage. A microestimation pump was used to feed the styrene and two hours were spent for the feeding. During the time the polymerization temperature was kept at 50° C. and stirring was continued. After the addition of styrene was completed, stirring was further continued for one hour. Then to the polymerization liquid were added 50 ml of methanol as a polymerization stopper and 2.0 g of 4-methyl-2,6-di-tertiary-butyl phenol as an antioxidant to stop the polymerization. The obtained polymerization liquid was a white suspension. Neither big lumpish deposits nor polymer's sticking to the reaction vessel wall and the stirring vanes was recognized.

The polymerization liquid was filtered to recover polymer particles. The resulting polymer was subjected to vacuum drying and gave a yield of 192 g. The grain size of the dried powder was uniform and the bulk density was 0.27 g/cm$^3$.

The intrinsic viscosity [η] of the polymer measured in toluene at 30° C. was 0.86 dl/g. A measurement of the refractive index showed that the polymer contains 20.1% by weight of butadiene unit. Further, the molecular weight distribution of the polymer measured by a gel-permeation chromatography was very narrow. The Q value (a ratio of weight average molecular weight to number average molecular weight) was 1.30.

As the antioxidant, 0.5 part of 4-methyl-2,6-di-tertiary-butylphenol and 0.5 part of 4,4'-butylidene-bis-(6-tertiary-butyl-3-methylphenol) per 100 parts of dried polymer were added to said polymer, and the mixture was made pellets by an extruder. The resulting pellets were molded by an injection molder to produce test specimens for use in physical property test. Table 1 shows the measurement result of the physical properties of the molded products.

Table 1

| | | |
|---|---|---|
| Intrinsic viscosity (dl/g) | (Note 1) | 0.86 |
| Tensile strength (kg/cm$^2$) | (Note 2) | 312 |
| Elongation (%) | (Note 2) | 144 |
| Izod impact strength (kg . cm/cm$^2$) | (Note 3) | 2.0 |

Table 1-continued

| | | |
|---|---|---|
| Haze value (%) | (Note 4) | 7.5 |

Every molded product had an attractive fine appearance and clarity, and no destruction was caused when bending was repeated about 20 times.
(Note 1)
The intrinsic viscosity was measured in toluene at 30° C. using an Ubbelohde type viscosimeter.
(Note 2)
The measurement was made according to JIS K-6871 with No. 3 dumb-bell type test specimens, tension rate of 5 mm/min. and at a measurement temperature of 20° C.
(Note 3)
The measurement was made according to JIS K-6871 with notched specimens at a measurement temperature of 20° C.
(Note 4)
The measurement was made according to ASTM D-1003.

EXAMPLE 2

Under the same conditions as in Example 1 except that tetrahydrofuran used in Example 1 was not used, a polymerization was carried out. A polymer was obtained in a state suspended in hexane used as a solvent. Neither big lumpish deposits nor polymer's sticking to the wall of a reaction vessel and stirring vanes was recognized. Table 2 shows the physical properties of the resulting polymer measured by the same operation as in Example 1.

Table 2

| | |
|---|---|
| Intrinsic viscosity (dl/g) | 0.71 |
| Tensile strength (kg/cm$^2$) | 307 |
| Elongation (%) | 97 |
| Izod impact strength (kg . cm/cm$^2$) | 2.1 |
| Haze value (%) | 8.0 |

COMPARATIVE EXAMPLE 1

Under the same conditions as in Example 1 except that the total amount of styrene was added at a time at the second stage polymerization, a polymerization was carried out. The resulting polymer suspension liquid had a very bad stability, and a large amount of polymer was seen to adhere to the wall of reaction vessel and the stirring vanes.

COMPARATIVE EXAMPLE 2

Following the same procedure as in Example 1, a polymerization was carried out except that 120 g. of styrene was used at the first stage polymerization and a mixture comprising 40 g. of styrene, 40 g of butadiene and 0.36 g. of tetrahydrofuran was added at the second stage polymerization. A large portion of the resulting polymer was adhered on the vessel wall and stirring vanes, so that the desired suspension liquid was not obtained.

COMPARATIVE EXAMPLE 3

Following the same procedure as in Example 1, a polymerization was carried out except that 40 g. of butadiene was used at the first stage polymerization and 160 g. of styrene was added with 2 hours at the second stage polymerization. The resulting polymer was suspension form, but some part of polymer was adhered on the vessel wall.

Table 3 shows the physical properties of the resulting polymer measured by the same method as used in Example 1.

Table 3

| | |
|---|---|
| Intrinsic viscosity (dl/g) | 0.75 |
| Tensile strength (kg/cm$^2$) | 295 |
| Elongation (%) | 8 |

Table 3-continued

| | |
|---|---|
| Izod impact strength (kg . cm/cm$^2$) | 1.7 |
| Haze value (%) | 8.0 |

As is clear from Table 3, a polymer obtained by using a conjugated diene alone in the polymerization of the first stage has no sufficiently good physical properties.

EXAMPLES 3 TO 6

In accordance with Example 1 except that the monomers, Lewis basic compounds and solvents were used in such addition orders and combinations as shown in Table 4, polymerizations and after-treatments were carried out.

Table 4

| Example No. | Monomers for 1st.-stage polymerization | | | Styrene for 2nd.-stage polymerization (g) | Solvent |
|---|---|---|---|---|---|
| | Styrene (g) | Butadiene (g) | Tetrahydrofuran (g) | | |
| 3 | 60 | 40 | 0.50 | 100 | Hexane |
| 4 | 50 | 30 | 0.50 | 120 | Hexane |
| 5 | 30 | 60 | 2.0 | 110 | Hexane |
| 6 | 40 | 40 | 0.36 | 120 | Heptane |

Every polymer was obtained in a state suspended in a solvent.

Table 5 shows the measurement result of the physical properties of the obtained polymers.

Table 5

| Example No. | [η] (dl/g) | Tensile strength (kg/cm$^2$) | Elongation (%) | Izod impact strength (kg . cm/cm$^2$) | Haze value (%) |
|---|---|---|---|---|---|
| 3 | 0.81 | 315 | 120 | 2.2 | 8.5 |
| 4 | 0.75 | 350 | 55 | 2.0 | 6.0 |
| 5 | 0.78 | 265 | 140 | 2.4 | 9.5 |
| 6 | 0.90 | 320 | 85 | 2.2 | 11.5 |

EXAMPLE 7

An oligoisoprenyldilithium compound used as a polymerization initiator in the present example was synthesized by the following method.

The inside of a four-necked flask with a capacity of 300 ml was substituted with argon gas, and into the flask were placed 50 ml of a refined and dried tetrahydrofuran and 0.35 g. (0.05 mol) of a metallic lithium formed as a dispersion form. A liquid containing 6.4 g. (0.05 mol) of naphthalene dissolved in 150 milliliters of tetrahydrofuran was added to the mixture through a dropping funnel and a reaction was carried out for 24 hours to synthesize a naphthalenelithium complex compound.

Subsequently, the reaction liquid was cooled and 40 ml of a refined isoprene was slowly added to the reaction liquid, keeping the temperature of the reaction liquid at −40° C. to −50° C. The mixture was allowed to react for about six hours and then the temperature of the liquid was slowly elevated to room temperature. The tetrahydrofuran used as a solvent was distilled off from the thus obtained oligoisoprenyl dillithium solution, under a reduced pressure. Then 400 ml of a newly refined and dried n-hexane were added thereto to dissolve uniformly said oligoisoprenyl dilithium. The resulting hexane solution was divided into ampoules for use for polymerization reactions.

The inside of a pressure resistant glass autoclave with a capacity of 2.5 liters having a stirrer was substituted with an inert gas, and into the autoclave were placed 1.5 liters of dry hexane which had been dehydrated and deaerated in advance and 40 g. of styrene which was newly distilled and dried through a column of silica gel and 0.36 g. (5.0 millimols) of tetrahydrofuran. Subsequently, 40 g. of a refined and dried butadiene were added to the mixture, and then 50 ml of the hexane solution of oligoisoprenyl dilithium polymerization initiator as previously synthesized were poured into the autoclave to initiate a polymerization. The polymerization of the first stage was carried out at 50° C. for three hours.

While the polymerization of the first stage was carried out, neither lumpish deposits nor polymer's sticking to the vessel wall was recognized. Next, an addition of 120 g. of styrene was started to carry out the polymerization of the second stage.

A microestimation pump was used for the addition of styrene and two hours were spent for it. During the addition of styrene, the polymerization temperature was kept at 50° C. and stirring was continued. After the addition of styrene was completed, stirring was further continued for one hour. Then, 50 ml of methanol as a polymerization stopper and 2.0 g. of 4-methyl-2,6-ditertiary-butyl phenol as an antioxidant were added to the polymerization liquid to stop the polymerization. The obtained polymerization liquid was a white suspension liquid, and neither big lumpish deposits nor polymer's sticking to the wall of reaction vessel and the stirring vanes was recognized.

The polymerization liquid was filtered to recover polymer particles. The resulting polymer was subjected to vacuum drying and the dried polymer gave a yield of 188 g. The grain size of the dried powder was uniform and the bulk density was 0.24 g/cm$^3$.

The intrinsic viscosity [η] of the polymer measured in toluene at 30° C. was 0.76 dl/g. A measurement of the refractive index showed that the polymer contains 21.0% by weight of butadiene unit. Further, the molecular weight distribution of the polymer measured by a gel-permeation chromatography was very narrow. The Q value (a ratio of weight average molecular weight to number average molecular weight) was 1.35.

As the antioxidant, 0.5 part of 4-methyl-2,6-di-tertiary-butylphenol and 0.5 part of 4,4'-butylidene-bis-(6-tertiary-butyl-3-methylphenol) per 100 parts of dried polymer were added to said polymer, and the mixture was made into pellets by an extruder. The resulting pellets were molded by an injection molder to produce test specimens for use in physical property tests.

Table 6 shows the measurement result of the physical properties of the molded products.

Table 6

| | | |
|---|---|---|
| Intrinsic viscosity (dl/g) | (Note 1) | 0.76 |
| Tensile strength (kg/cm$^2$) | (Note 2) | 285 |
| Elongation (%) | (Note 3) | 175 |
| Izod impact strength (kg . cm/cm$^2$) | (Note 3) | 2.2 |

Table 6-continued

| Haze value (%) | (Note 4) | 10.5 |
| --- | --- | --- |

Every molded product had an attractive fine appearance and a clarity, and no destruction was caused when bending was repeated about 20 times.
(Note 1)
The intrinsic viscosity was measured in toluene at 30° C. using an Ubbelohde type viscosimeter.
(Note 2)
The measurement was made according to JIS K-6871 using No. 3 dumb-bell type test specimens, with tension rate of 5 mm/min. at measurement temperature of 20° C.
(Note 3)
The measurement was made according to JIS K-6871 using notched specimen at measurement temperature of 20° C.
(Note 4)
The measurement was made according to ASTM D-1003.

Comparative Example 4

Under the same conditions as in Example 7 except that the total amount of styrene was added at a time at the polymerization of the second stage, a polymerization was carried out. The resulting polymer suspension liquid had a very bad stability, and a large amount of polymer was adhered to the wall of reaction vessel and the stirring vanes.

Comparative Example 5

Following the same procedure as in Example 7, the first-stage polymerization was carried out by using 120 g. of styrene, and the second-stage polymerization by using a mixture of 40 g. of styrene, 40 g. of butadiene and 0.36 g. of tetrahydrofuran. Most of the obtained polymer was adhered to the wall of reaction vessel and the stirring vanes and the polymer was not obtained as a suspension state.

Comparative Example 6

Following the same procedure as in Example 7, the first-stage polymerization was carried out by using 40 g. of butadiene, and the second-stage polymerization by adding 160 g. of styrene and spending two hours for the addition. The resulting polymer was obtained as a suspension liquid, but some polymer was adhered to the wall of the reaction vessel.

Table 7 shows the physical properties of the resulting polymer measured by the same method as used in Example 7.

Table 7

| Intrinsic viscosity (dl/g) | 0.70 |
| --- | --- |
| Tensile strength (kg/cm$^2$) | 290 |
| Elongation (%) | 8 |
| Izod impact strength (kg . cm/cm$^2$) | 1.7 |
| Haze value (%) | 8.5 |

As is clear from Table 7, a polymer obtained by using a conjugated diene alone in the polymerization of the first stage has no good physical properties.

EXAMPLES 8 TO 11

In accordance with Example 7 except that the monomers, initiators and solvents were used in such combinations as shown in Table 8, polymerizations and after-treatments were carried out. All the additions of monomers for the second-stage polymerization were conducted using a microestimation pump and spending two hours.

Table 8

| Example No. | Monomers for 1st.-stage polymerizaton | | Initiator | Monomer for 2nd-stage polymerization styrene (g) | Solvent |
| --- | --- | --- | --- | --- | --- |
| | Styrene (g) | Butadiene (g) | | | |
| 8 | 40 | 40 | Oligobutadienyl dilithium | 120 | Hexane |
| 9 | 30 | 60 | Oligoisoprenyl dilithium | 110 | Pentane |
| 10 | 50 | 30 | Oligoisoprenyl dilithium | 120 | Hexane |
| 11 | 60 | 40 | Oligoisoprenyl dilithium | 100 | Pentane |

Every polymer was obtained in a state suspended in a solvent, and gave a yield in the vicinity of 100%. The measurement results of the physical properties of the obtained polymers are shown in Table 9.

Table 9

| Example No. | [η] (dl/g) | Tensile strength (kg/cm$^2$) | Elongation (%) | Izod impact strength (kg . cm/cm$^2$) | Haze value (%) |
| --- | --- | --- | --- | --- | --- |
| 8 | 0.85 | 315 | 155 | 2.2 | 11.0 |
| 9 | 0.74 | 270 | 240 | 2.4 | 15.0 |
| 10 | 0.69 | 330 | 95 | 2.0 | 8.0 |
| 11 | 0.76 | 300 | 135 | 2.2 | 8.5 |

Every polymer had a clarity and an attractive fine appearance.

EXAMPLE 12

The inside of an autoclave with a capacity of 100 liters having a stirrer was substituted with nitrogen, and into the autoclave were placed 60 liters of hexane, 4 kg. of styrene, 4 kg. of butadiene and 36 g. of tetrahydrofuran (an activator). And after an addition of 200 millimols of a hexane solution of n-butyllithim (an initiator), the autoclave was heated to 60° C. and a polymerization reaction was carried out for three hours. Subsequently, 12 kg of styrene was fed with spending two hours at a flow rate of 6 kg/hr. During the feeding, the polymerization temperature was kept at 60° C. After the feeding of styrene was completed, stirring was continued for one hour at 60° C. to complete the polymerization reaction. After that, the liquid contained in the autoclave was taken out into a slurry tank with a capacity of 250 liters, and 100 liters of cold hexane at −20° C. for dilution use and 100 ml of methanol as a stopper were added to the liquid in the tank and stirring was given to the liquid. The resulting polymerization liquid was in a white slurry state. Big lumps and polymer's sticking to the vessel wall were hardly recognized. Subsequently, using a cage type centrifugal separator, the polymer slurry was subjected to separation batchwisely. The separated polymer was in the condition of white and somewhat soft particles having an average particle size of about 0.2 mm. The filtrate was transparent. A gas-chromatographic analysis showed that unreacted monomers were not substantially detected in the filtrate. Further, when 10 liters of the filtrate was subjected to concentration and drying, 3.8 g of viscous unvolatile substance as a soluble part was obtained.

Subsequently, 100 g of 4-methyl-2,6-di-tertiary butylphenol and 100 g of tris-(nonylphenyl)-phosphite were added as the stabilizing agent to the resulting polymer cake. These stabilizing agents were added in a nitrogen steam, using a drum type rotary blender.

Next, in the drying and granulating steps, the following operations were carried out. Firstly, the polymer cake was subjected to extrusion, using a one-step vent type extruder having a screw diameter of 65 mm and a screw L/D=20. The extruded strands were cut to make pellets. The condition for operation of the extruder is as shown in Table 10.

Table 10

| Cylinder temperature | 190° C. |
|---|---|
| Die temperature | 170° C. |
| Number of revolution | 60 rpm |
| A vacuum pump | an evacuation amount of 3,000 litres/min. |

The extruder used was of a one-step vent type. Hence, the dryness of the resin was not always sufficient. The analysis revealed that the content of a volatile matter remaining in the pellets was about 1.5% on the average. Therefore, the obtained pellets were subjected to a ventilation drying to remove the residual moisture from the pellets.

After the ventilation drying, again using the same extruder, drying and pelletizing were carried out under the same condition as shown in Table 10. As a result of the re-pelletization, the volatile matter contained in the pellets decreased to 0.2%. Thus, a clear polymer resin which makes the object of the present invention was produced by extremely simplified steps.

The resulting pellets were molded by an injection molder to make test specimens for use in a physical property test. By the usual method, the measurement was made on the physical properties. The measurement result is shown in Table 11. Every molded product was found to have a clarity, a very attractive fine appearance and excellent mechanical properties.

Table 11

| Melt index (g/10 min.) | (Note 1) | 0.45 |
|---|---|---|
| Tensile strength (kg/cm$^2$) | (Note 2) | 305 |
| Elongation (%) | (Note 2) | 190 |
| Izod impact strength, notched (kg . cm/cm$^2$) | (Note 3) | 2.2 |
| without notch kg . cm/cm$^{cm/cm2}$ | (Note 4) | 21.5 |
| Haze value (%) | (Note 5) | 6.0 |

(Note 1)
Measured according to JIS-K6760.
(Note 2)
Measured at 20° C. according to JIS-K6871.
(Note 3)
Measured on notched test specimens at 20° C. according to JIS-K6871.
(Note 4)
Measured on test specimens without notch at 20° C. according to JIS-K6871.
(Note 5)
Measured according to ASTM-D1003.

What is claimed is:

1. A process for producing a clear block copolymer resin according to a suspension polymerization process which comprises
   block copolymerizing a mixture of 70 to 90 parts by weight of an aromatic vinyl compound monomer and 10 to 30 parts by weight of a conjugated diene monomer in two stages using an organolithium compound as a polymerization initiator, characterized by
   using an aliphatic hydrocarbon selected from the group consisting of propane, butane, pentane, hexane, heptane, nonane, decane, and mixtures thereof as a solvent,
   adding, in the first polymerization stage, a mixture of 10 to 60 parts by weight of the aromatic vinyl compound monomer out of the total amount thereof and the total amount of the conjugated diene monomer to the reaction system to polymerize all the monomers substantially for the formation of an elastomeric copolymer block, and
   continuously adding, subsequently in the second polymerization stage, all the remaining aromatic vinyl compound monomer to the reaction system at a polymerization rate that the added monomer is substantially polymerized at once and that no unreacted monomer is substantially present in the reaction system, and continuing the polymerization to polymerize all the monomer substantially for the formation of a non-elastomeric block, said polymerization being carried out at a temperature of from about 20° C. to about 80° C.

2. The process as defined in claim 1, wherein the block copolymer resin obtained by using an organomonolithium compound as the organolithium compound is a two-blocks copolymer resin.

3. The process as defined in claim 1, wherein the block copolymer resin obtained by using an organodilithium compound as the organolithium compound is a three-blocks copolymer resin.

4. The process as defined in claim 1, wherein the aromatic vinyl compound monomer is styrene, alpha-methyl styrene or vinyl toluene.

5. The process as defined in claim 4, wherein the aromatic vinyl compound monomer is styrene.

6. The process as defined in claim 1, wherein the conjugated diene monomer is 1,3-butadiene, isoprene or pyperylene.

7. The process as defined in claim 6, wherein the conjugated diene monomer is 1,3-butadiene.

8. The process as defined in claim 1, wherein the polymerization time is up to 48 hours.

9. The process as defined in claim 1, wherein the suspension polymerization process is followed by a combined steps of a solid-liquid separation step which comprises separating the produced polymer particles from the solvent and a pelletizing step which comprises heating, kneading, drying the separated polymer particles under a reduced pressure and then pelletizing the dried polymer.

10. The process as defined in claim 9, wherein the saturated aliphatic hydrocarbon having 3 to 20 carbon atoms is hexane.

11. The process as defined in claim 1, wherein a Lewis basic compound is used in an amount of 10% by weight per total weight of all the monomers for the formation of an elastomeric copolymer block.

12. The process as defined in claim 11, wherein the Lewis basic compounds are ether compounds.

13. The process as defined in claim 12, wherein the ether compound is tetrahydrofuran, tetrahydropyran, diethylether, or diethyleneglycoldimethylether.

14. The process as defined in claim 2, wherein the organomonolithium compound is at least one member selected from the group consisting of ethyllithium, propyllithium, butyllithium, amyllithium, hexyllithium, 2-ethylhexyllithium, cyclohexyllithium, decyllithium, dodecyllithium, phenyllithium, tolyllithium, xylyllithium and naphthyllithium.

15. The process as defined in claim 14, wherein the organomonolithium is n-butyllithium.

16. The process as defined in claim 3, wherein the organodilithium compound is at least one member selected from the group consisting of trimethylenedilithium, tetramethylenedilithium, pentamethylenedilithium, naphthalenelithium complex, stilbenelithium complex and biphenyllithium complex.

17. The process as defined in claim 16, wherein naphthalenelithium complex is used as the organodilithium compound.

18. The process as defined in claim 2, wherein the organomonolithium compound is used in an amount of 0.01 to 1 mol % per total weight of all the monomers.

19. The process as defined in claim 3, wherein the organodilithium compound is used in an amount of 0.005 to 0.5 mol % per total weight of all the monomers.

20. The process as defined in claim 9, wherein the mixture of 90 to 65 parts by weight of an aromatic vinyl compound monomer and 10 to 35 parts by weight of a conjugated diene monomer is used.

21. The process as defined in claim 9, wherein a vent type extruder is used at the pelletizing step.

* * * * *